US012599873B2

(12) United States Patent
Chernyi et al.

(10) Patent No.: US 12,599,873 B2
(45) Date of Patent: Apr. 14, 2026

(54) DEVICE FOR MEMBRANE PURIFICATION OF A LIQUID

(71) Applicant: ELECTROPHOR, INC., Woodmere, NY (US)

(72) Inventors: Alexander Alexandrovich Chernyi, St. Petersburg (RU); Ivan Ivanovich Ogdanskiy, Romanovka (RU); Joseph L. Shmidt, Woodmere, NY (US)

(73) Assignee: ELECTROPHOR, INC., Woodmere, NY (US)

( * ) Notice: Subject to any disclaimer, the term of this patent is extended or adjusted under 35 U.S.C. 154(b) by 777 days.

(21) Appl. No.: 18/266,426

(22) PCT Filed: Jul. 27, 2020

(86) PCT No.: PCT/RU2020/000396
§ 371 (c)(1),
(2) Date: Jun. 9, 2023

(87) PCT Pub. No.: WO2021/061007
PCT Pub. Date: Apr. 1, 2021

(65) Prior Publication Data
US 2024/0042389 A1     Feb. 8, 2024

(30) Foreign Application Priority Data
Sep. 24, 2019    (RU) ........................... RU2019130018

(51) Int. Cl.
*B01D 61/12*         (2006.01)
*C02F 1/44*          (2023.01)
(Continued)

(52) U.S. Cl.
CPC ................ B01D 61/12 (2013.01); C02F 1/44 (2013.01); G05D 7/0166 (2013.01);
(Continued)

(58) Field of Classification Search
CPC .... B01D 61/12; B01D 2313/50; B01D 61/10; B01D 63/02; B01D 61/00; B01D 63/00;
(Continued)

(56) References Cited

U.S. PATENT DOCUMENTS 3,939,074 A * 2/1976 Bray ...................... B01D 61/12
                                                    210/257.2
4,502,953 A * 3/1985 Marsh .................... B01D 61/08
                                                    210/257.2
(Continued)

FOREIGN PATENT DOCUMENTS

DE    102007016487 A1 * 10/2007  ............. B01D 21/30
RU       2484884 C1 * 6/2013
(Continued)

OTHER PUBLICATIONS

English translation of DE_102007016487, Oct. 18, 2007. (Year: 2007).*
(Continued)

*Primary Examiner* — Joseph W Drodge
(74) *Attorney, Agent, or Firm* — Anna Vishev

(57) ABSTRACT

The invention relates to autonomous membrane liquid purification devices with the possibility of recirculation and/or desalination of liquid, mainly water from various sources for domestic and/or drinking water supply and is intended for use in domestic conditions, public institutions, in suburban and garden areas. A membrane liquid purification device consisting of a liquid tank, a liquid withdrawal means, a pressure increasing means, a liquid purification unit, a purified liquid line and a drainage line, characterized in that it is made with the possibility of taking liquid from preferably the surface layer of liquid in a liquid tank and automatically stopping the liquid purification process when the
(Continued)

liquid level in the liquid tank reaches a set value and/or after the required volume of liquid is purified.

7 Claims, 4 Drawing Sheets

(51) Int. Cl.
*G05D 7/01* (2006.01)
*C02F 1/00* (2023.01)

(52) U.S. Cl.
CPC .......... *B01D 2311/16* (2013.01); *C02F 1/006* (2013.01); *C02F 1/008* (2013.01)

(58) Field of Classification Search
CPC ........ B01D 65/00; B01D 61/20; B01D 61/22; B01D 2311/16; B01D 2311/25; B01D 2311/252; B01D 2311/2523; G05D 7/0166; C02F 1/006; C02F 1/008; C02F 1/283; C02F 1/42; C02F 2201/006; C02F 2201/009; C02F 1/441; C02F 2301/046; C02F 1/44; C02F 1/444; C02F 2209/42; Y02A 20/131
USPC ................................................. 210/121–123
See application file for complete search history.

(56) References Cited

U.S. PATENT DOCUMENTS

| | | | | |
|---|---|---|---|---|
| 5,520,816 | A | * | 5/1996 | Kuepper .............. B01D 61/081 |
| | | | | 210/744 |
| 2015/0291448 | A1 | * | 10/2015 | Koppenhoefer ........ C02F 1/441 |
| 2018/0111070 | A1 | * | 4/2018 | Burrows .............. B01D 35/147 |
| 2020/0156977 | A1 | * | 5/2020 | Kirkendall ................ C02F 9/00 |

FOREIGN PATENT DOCUMENTS

| | | | | | |
|---|---|---|---|---|---|
| RU | 2529073 | C2 | * | 9/2014 | ......... F02M 37/0076 |
| RU | 2597605 | C1 | * | 9/2016 | ................ C02F 9/00 |
| RU | 2628389 | C2 | * | 8/2017 | ............. B01D 65/02 |

OTHER PUBLICATIONS

English translation of RU_248884_C1, Jun. 20, 2013. (Year: 2013).*
English translation of RU_2529073_C2, Sep. 27, 2014. (Year: 2014).*
English translation of RU_2597605_C1, Sep. 10, 2016. (Year: 2016).*
English translation of RU_2628389_C2, Aug. 16, 2017. (Year: 2017).*

* cited by examiner

US 12,599,873 B2

1

DEVICE FOR MEMBRANE PURIFICATION OF A LIQUID

The invention relates to autonomous membrane liquid purification devices with the possibility of recirculation and/or desalination of liquid, mainly water from various sources for domestic and/or drinking water supply and is intended for use in domestic conditions, public institutions, in suburban and garden areas.

Membrane liquid purification devices are well-known and widely distributed. Most of the known membrane liquid purification devices are mounted permanently to the source of the liquid, which limits the applicability of these systems in conditions where there are several sources of the liquid or the source of the liquid is not constant, as well as in cases where operating conditions do not allow the device to be near the source of the liquid. Semi-autonomous membrane liquid purification devices are also known from the state of the art, which have means of dynamically connecting to the source of the source liquid. These devices can also not be used in cases where it is impossible to place the device near the source of the source liquid or when it is necessary to move the device during operation, which is a limitation for the use of these devices and a significant disadvantage. Autonomous membrane liquid purification devices do not depend on the number of possible sources of the source liquid and the location of the liquid source, which makes such devices more versatile and expands the scope of their possible application.

In the state of the art a membrane liquid purification device is known according to U.S. Pat. No. 5,039,402 [IPCC02F 9/00, publ.13.08.1991]. The specified membrane liquid purification device includes a container for the source liquid equipped with a liquid outlet, which is located at the bottom of the container for the source liquid, a liquid supply unit including a pressure increasing means, a liquid supply line and a blocking means made in the form of a liquid level indicator in the container for the source liquid, a liquid purification unit, a container for purified liquid and a drainage liquid line. In this case, the container for the source liquid is connected to the liquid supply unit through the liquid outlet and has a functional connection with the liquid supply unit through the liquid level indicator of the blocking means located in the container for the source liquid. The outlet of the liquid supply unit is connected to the inlet of the liquid purification unit, which has two options: an outlet for purified liquid connected to a container for purified liquid, and an outlet for drainage liquid connected to the drainage liquid line.

The device works as follows. The source liquid from the container for the source liquid through the liquid inlet enters the liquid supply unit and then flows into the liquid purification unit. In the liquid purification unit, the liquid purification process is carried out, while the purified liquid goes through the outlet for the purified liquid of the liquid purification unit into the container for the purified liquid, and the drainage liquid is fed through the outlet for the drainage liquid of the liquid purification unit to the drainage liquid line and is discharged from the system. The liquid purification process continues until the liquid level in the container for the source liquid reaches the level where the liquid level indicator of the locking device is located, after this process the liquid supply unit is switched off. The construction of this device does not provide for the possibility of regulating the degree of use of the source liquid, since the system does not provide for the possibility of returning the drainage liquid to the container for the source liquid, which is inefficient from the point of view of the consumption of the source liquid to obtain a purified liquid and is a disadvantage of this system.

From the state of the art, a membrane liquid purification device is known according to patent U.S. Pat. No. 8,945,377 [IPC C02F 1/44, B01D 31/10, C02F1/00, B01D 61/08, B01D 61/12, publ. May 2, 2015], consisting of a container for source and drainage liquid separated by a horizontal partition with an opening, a liquid withdrawal element from the specified container, a pressure increasing means, liquid purification unit, a tank for the purified liquid a container for purified liquid and a line for returning drainage liquid to a container for source and drainage liquid. In this case, the liquid withdrawal element is in the container for the source and drainage liquid above the partition. The inlet of the pressure increasing means is connected to the liquid withdrawal element, the outlet of the pressure increasing means is connected to the inlet of the liquid purification unit. The outlet for the purified liquid of the liquid purification unit is connected to the tank for purified liquid. The outlet of the drainage liquid of the liquid purification unit is connected to the inlet of the drainage liquid line. The drainage liquid line is made in the form of tube, at least part of which is located inside the container for the source and drainage liquid, while the outlet of the drainage liquid is in the container for the source and drainage liquid below the partition.

The device works as follows. The container for the source and drainage liquid is filled with the source liquid. The source liquid through the liquid withdrawal element comes from the container for source and drainage liquid to the inlet of the pressure increasing means. After the pressure increasing means, the source liquid enters the liquid purification unit, where the liquid is purified. In this case, the purified liquid enters the purified liquid container through the outlet for the purified liquid. The drainage liquid through the outlet for the drainage liquid along the drainage liquid line returns to the container for the source and drainage liquid, while displacing the source liquid through the liquid intake element to the inlet of the pressure increasing means and further along the cycle. The main disadvantage of this device is that the liquid withdrawal element is located so that the liquid withdrawal from the middle layers of the liquid in the container for the source and drainage liquid. Since the drainage liquid is returned in the lower part of the tank, the mixing of the source and drainage liquid occurs in the middle layers, therefore the composition of the liquid in the middle layers is uneven and changes abruptly during filtration, which reduces the service life of the pressure increasing means, reduces the reliability of the liquid purification unit.

From the state of the art, a membrane liquid purification device is known according to patent RU 2597605 [IPC B01D 17/12, B01D 37/00, B01D 61/00, B01D 61/12, B01D 63/00, publ. Oct. 9, 2016], chosen by the applicant as the closest analogue. The membrane liquid purification device according to RU 2597605 consists of a liquid tank, a liquid withdrawal means, a pressure increasing means, a liquid purification unit, a tank for purified liquid and a liquid drainage line. In this case, the liquid container is connected through the liquid withdrawal means to the inlet of the pressure increasing means, the outlet of which is connected to the inlet of the liquid purification unit. The liquid purification unit has an outlet for purified liquid connected to a tank for purified liquid, a and a drainage liquid outlet connected to a drainage line that is connected to a liquid container.

The device for membrane liquid purification according to RU 2597605 works as follows. The liquid tank is filled with the source liquid to the source liquid lever. From the liquid tank though the liquid withdrawal means, the source liquid enters the inlet of the pressure increasing means, from where it enters the inlet of the liquid purification unit. Two liquid streams come out of the liquid purification unit: a stream of purified liquid that enters the tank for purified liquid; the drainage liquid flow, which is returned to the liquid container along the drainage line, so, the process of liquid purification with recirculation is realized. The liquid purification process continues until the liquid level in the liquid tank reaches the specified level. When the liquid reaches a predetermined level, at least one air bubble will enter the inlet of the pressure increasing means through the liquid withdrawal means, which leads to a stop of the liquid purification process and the device is turned off. The main disadvantage of the closest analogue is that the liquid purification means is located in the lower (bottom) or middle part of the tank, at the same time, the liquid purification occurs from the lower or middle layers of the liquid, where the composition of the liquid is most uneven due to the return of the drainage liquid, thus, the content of contaminants in the liquid that enters the inlet of the pressure increasing means and further to the inlet of the liquid purification unit during filtration, varies unevenly, which does not allow the liquid purification unit to operate in an optimal mode, which reduces the efficiency of the liquid purification process.

The objective of the invention and the technical results achieved by using the invention is the development of a membrane liquid purification device, in particular for drinking water, with the possibility of increasing the efficiency of liquid purification by achieving a uniform change in the composition of the filtered liquid.

The task set and required technical result when using the device is archived by the fact that the membrane liquid purification device, consisting of a liquid tank, a liquid withdrawal means, a pressure increasing means, a liquid purification unit, a purified liquid line and a drainage line, is made with the possibility of liquid purification from preferably a surface layer of liquid in a liquid tank and automatically stopping the liquid purification process when the liquid level in the liquid tank reaches a set value and/or after purified the required volume of liquid, in this case, the liquid withdrawal means is made with the possibility of vertical movement when the liquid level changes in the liquid tank and is made in the form of a flexible tube and a floating element or in the form of a flexible tube, a hinge mechanism, a rocket arm and a floating element, while the floating element can be additionally equipped with stops of a given height or adjustable height stops, and the floating element can also be additionally equipped with a rim and/or a screen made with the possibility of separating the liquid taken from the liquid container from the drainage liquid, in this case, the liquid container may additionally contain protrusions and/or motion limiters, and the pressure increasing means may additionally be equipped with a means of disconnection.

Figure 1:
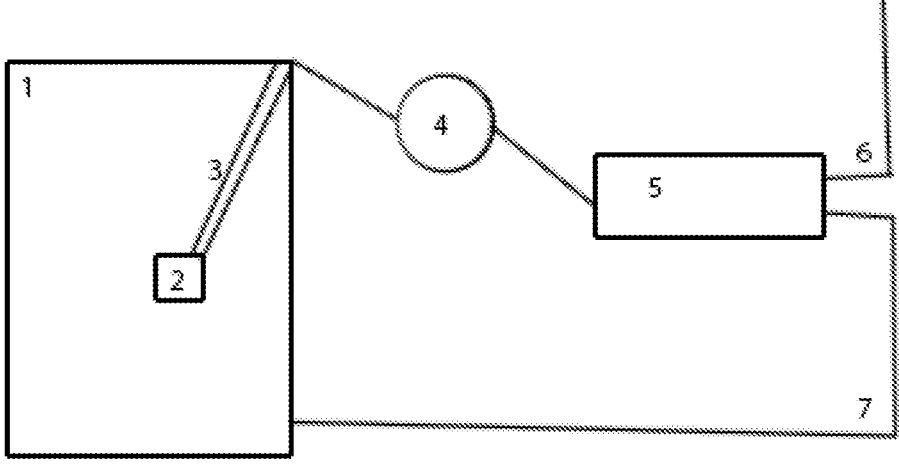
FIG. 1 shows a diagram of a membrane liquid purification device.
Figure 2:
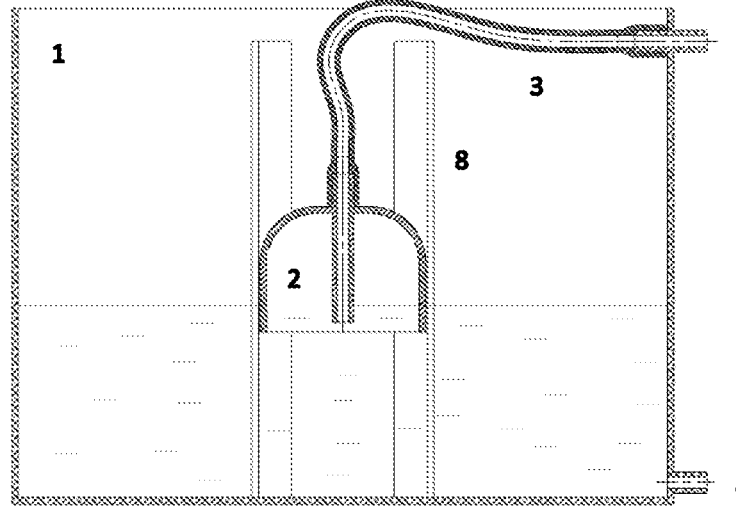
FIGS. 2-3 show examples of a liquid tank of a membrane liquid purification device, where the liquid purification means consists of a flexible tube and a floating element.
Figure 3:
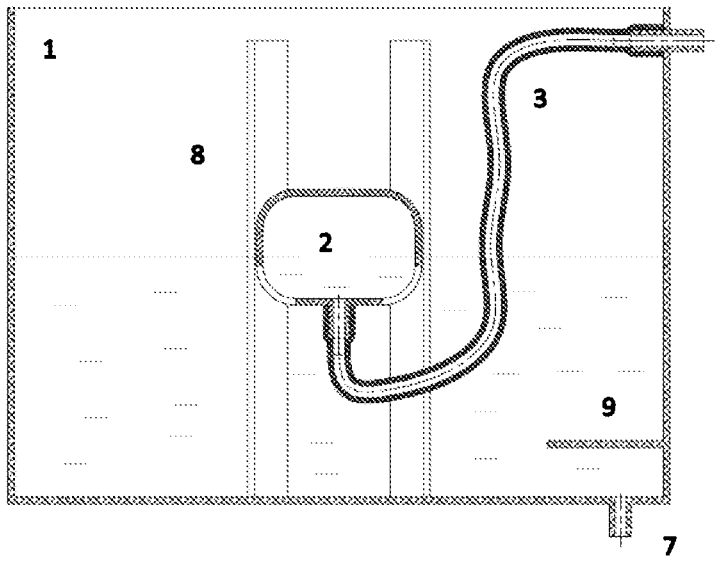
Figure 4:
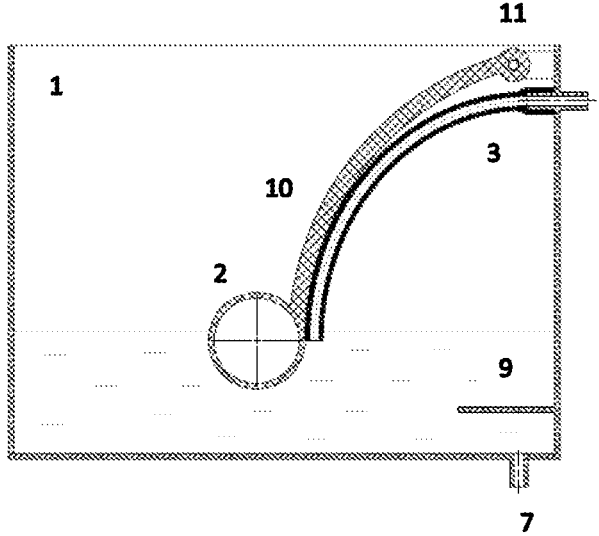
FIG. 4 shows an example of a liquid tank of a membrane liquid purification device, where the liquid withdrawal means consists of a flexible tube, a hinge mechanism, a rocket arm, and a floating element.

The membrane liquid purification device (FIG. 1) includes a liquid tank (1), a liquid withdrawal means (not indicated on the figures), a pressure increasing means (4), a liquid purification unit (5), a purified liquid line (6) and a drainage line (7).

The liquid tank (1) is connected through a liquid withdrawal means (not indicated in the figures) to the inlet of the pressure increasing means (4). The outlet of the pressure increasing means (4) is connected to the inlet of the liquid purification unit (5). The liquid purification unit (5) has an outlet for purified liquid connected to the purified liquid line (6) and an outlet for drainage liquid connected to the inlet of the drainage line (7), the outlet of which is connected to the liquid tank (1).

The liquid tank (1) is a reservoir made, for example, but not limited to the listed options, of polymeric materials or stainless steel. The liquid tank (1) may additionally contain projections (9) and/or motion limiters (8).

The liquid withdrawal means (not indicated in the figures) consists of, for example, a flexible tube (3) and a floating element (2) or a flexible tube (3), a hinge mechanism (11), a rocker arm (10) and a floating element (2). In this case, the attachment points of the flexible tube (3) and/or rocket arm (10) to the floating element (2) can be located at any point on the surface of the floating element (2). The floating element (2) is made of polymer materials, and it has at least one cavity, so the floating element (2) is able to float in the surface layer of the liquid. When the liquid level in the liquid tank (1) rises, the floating element (2) rises too and when the liquid level in the liquid tank (1) decreases, the floating element (2) falls. So, the floating element (2) moves vertically when the liquid level in the liquid tank (1) changes. The floating element (2) has at least one opening for the liquid to enter from the liquid tank (1). Additionally, the floating element (2) can be equipped with stops of a given height (not indicated in the figures) or stops of adjustable height (not shown in the figures). The floating element (2) can be additionally equipped with a rim and/or a screen (not shown in the figures), which are located below the liquid inlet opening.

The pressure increasing means (4) is a pump or a system of pumps, which are equipped with batteries. The pressure increasing means (4) can be additionally equipped with a turn off device for forcibly stopping the operation of the pressure increasing means.

The liquid purification unit (5) is made, for example, but not limited to the listed options, in the form of at least one of liquid purification means, for example, a reverse osmosis or hollow fiber membrane.

Additionally, the liquid purification unit (5) may include at least one pre-filter (not shown in the figures), for example, a polypropylene pre-purification element or a cartridge with a sorption mixture based on activated carbon and/or ion-exchange resins and fibers. Also, the liquid purification unit may include a post filter (not shown in the figures) made, for example, in the form of a cartridge with activated carbon as a sorbent and/or mineralizing material. The liquid purification unit (5) has inlet connected to a pressure increasing means (4), an outlet for purified liquid, connected to a purified liquid line (6), and an outlet for liquid connected to a drainage line (7).

The purified liquid line (7) is a tube made of polymer material through which purified liquid can be supplied for consumption. The purified liquid line (7) may additionally include a tap for liquid and/or a control valve and/or a container for purified liquid.

The purified liquid line (7) is a polymer tube, the inlet of which is connected to the outlet of the drainage liquid of the liquid purification unit (5). The outlet of the purified liquid line (7) is connected to the bottom of the side face or to the bottom of the liquid tank (1), or part of the purified liquid line (7) is located inside the liquid tank (1), while the open end of the drainage liquid return line is located at the bottom of the liquid tank (1).

Additionally, the device may include a housing and/or decorative protective panels, which made of polymer materials or stainless steel.

Within the framework of distinctive features this membrane liquid purification device described above works as follow.

The liquid tank (1) is filled with the source liquid. At the same time, unlike the closest analogue, the liquid tank (1) is filled with any amount of liquid, it is not necessary to achieve a predetermined liquid level in the liquid tank (1). From the liquid tank (1) through the liquid withdrawal means (not indicated in the figures), the source liquid enters the inlet of the pressure increasing means (4). At the same time, the purification of liquid is carried out preferably from the upper layers of the liquid. Through the pressure increasing means (4), the liquid enters the inlet of the liquid purification unit (5). Two liquid flows come out of the liquid purification unit (5): the flow of purified liquid, which is supplied for consumption through the purified liquid line (6); the flow of drainage liquid, which is returned to the liquid tank (1) through the drainage line (7), in this case, the process of liquid purification with recirculation is realized. In this case, the drainage liquid returns to the lower liquid layer in the tank for the source liquid (1), the mixing of the source liquid (with a lower content of impurities) and the drainage liquid (with a higher content of impurities) is carried out in the lower and middle layers of the liquid, and the liquid is taken from the upper layer. In this way, the content of impurities in the purified liquid—the liquid entering the liquid purification unit (6)— varies uniformly.

The purification liquid process continues until the floating element (2) of the liquid withdrawal means (not indicated in the figures) reaches the set level and/or until the consumer stops filtration by means of disconnecting the pressure increasing means. The set level can be determined by the length of the flexible tube (3), or by the amplitude of the movement of the hinge mechanism (11), or the set level can be the level of the bottom of the liquid tank (1). If the floating element (2) has stops of a given height (not shown in the figures) or stops of an adjustable height (not shown in the figures), a set level of liquid can stop with the bottom of the liquid tank (1). If there are protrusions (9) and/or motion limiters (8) in the liquid tank (I), the specified level can be determined by the location and shape of these protrusions (9) or motion limiters (8).

The present description of the invention presents a preferred embodiment of the invention. Changes can be made in it, within the limits of the claims, which makes it possible to use it widely.

The invention claimed is:

1. A membrane liquid purification device comprising:
   a liquid tank filled with a source liquid having a top layer and a bottom layer, said liquid tank having a top portion, a bottom portion, a source liquid outlet located within said top portion of said liquid tank, and a drainage liquid inlet located within said bottom portion of said liquid tank;
   a membrane liquid purification unit configured to purify said source liquid producing a purified liquid and a drainage liquid, said liquid purification unit having a source liquid inlet, a purified liquid line and a drainage liquid line connected to said drainage liquid inlet of said liquid tank;
   a liquid withdrawal means having a flexible tube with a first end and a second end, said second end of said flexible tube being connected to said source liquid outlet of said tank, said liquid withdrawal means further comprising a floating element connected to the first end of said flexible tube and positioned at a surface of said top layer of said source liquid within said liquid tank;
   a source liquid line connecting said source liquid outlet of said liquid tank to said source liquid inlet of said liquid purification unit; and
   a pressure increasing means disposed within said source liquid line between said source liquid outlet of said liquid tank and said source liquid inlet of said liquid purification unit, said pressure increasing means being configured to facilitate supply of said source liquid from said liquid tank to said liquid purification unit,
   wherein, when said pressure increasing means is activated, said source liquid flows from said surface of said top layer of the source liquid, through said flexible tube and said source liquid outlet of said liquid tank into the source liquid inlet of said liquid purification unit; wherein said liquid purification unit is configured to discharge said purified liquid through said purified liquid line and to discharge said drainage liquid through said drainage liquid line and through said drainage liquid inlet into said bottom portion of said liquid tank to be mixed with said bottom layer of said source liquid; wherein said floating element is configured to move vertically between said top portion of said liquid tank and said bottom portion of said liquid tank with said top layer of said source liquid while remaining at said surface of said top layer of said source liquid; and wherein said liquid purification unit is configured to automatically stop a liquid purification process said purification unit when said floating element at the surface of the top layer reaches a predetermined level.

2. The membrane liquid purification device according to claim 1, wherein said liquid withdrawal means further comprises a hinge mechanism and a rocker arm.

3. The membrane liquid purification device according to claim 2, wherein the floating element further comprises a plurality of stops of a given height.

4. The membrane liquid purification device according to claim 2, wherein the floating element further comprises a plurality of stops of an adjustable height.

5. The membrane liquid purification device according to claim 1, wherein the floating element further comprises a screen configured to separate said source liquid flowing from the liquid tank from said drainage liquid supplied into said liquid tank from said liquid purification unit.

6. The membrane liquid purification device according to claim 1, wherein said liquid tank further comprises a plurality of protrusions configured to limit said vertical movement of said floating element.

7. The membrane liquid purification device according to claim 1, wherein said pressure increasing means further comprises a means of disconnection configured to disconnect said pressure increasing means from said source liquid line thereby stopping the flow of said source liquid from said liquid tank.

* * * * *